6672X
P. MUNCH.
Bee Hive.
Patented July 27, 1831.
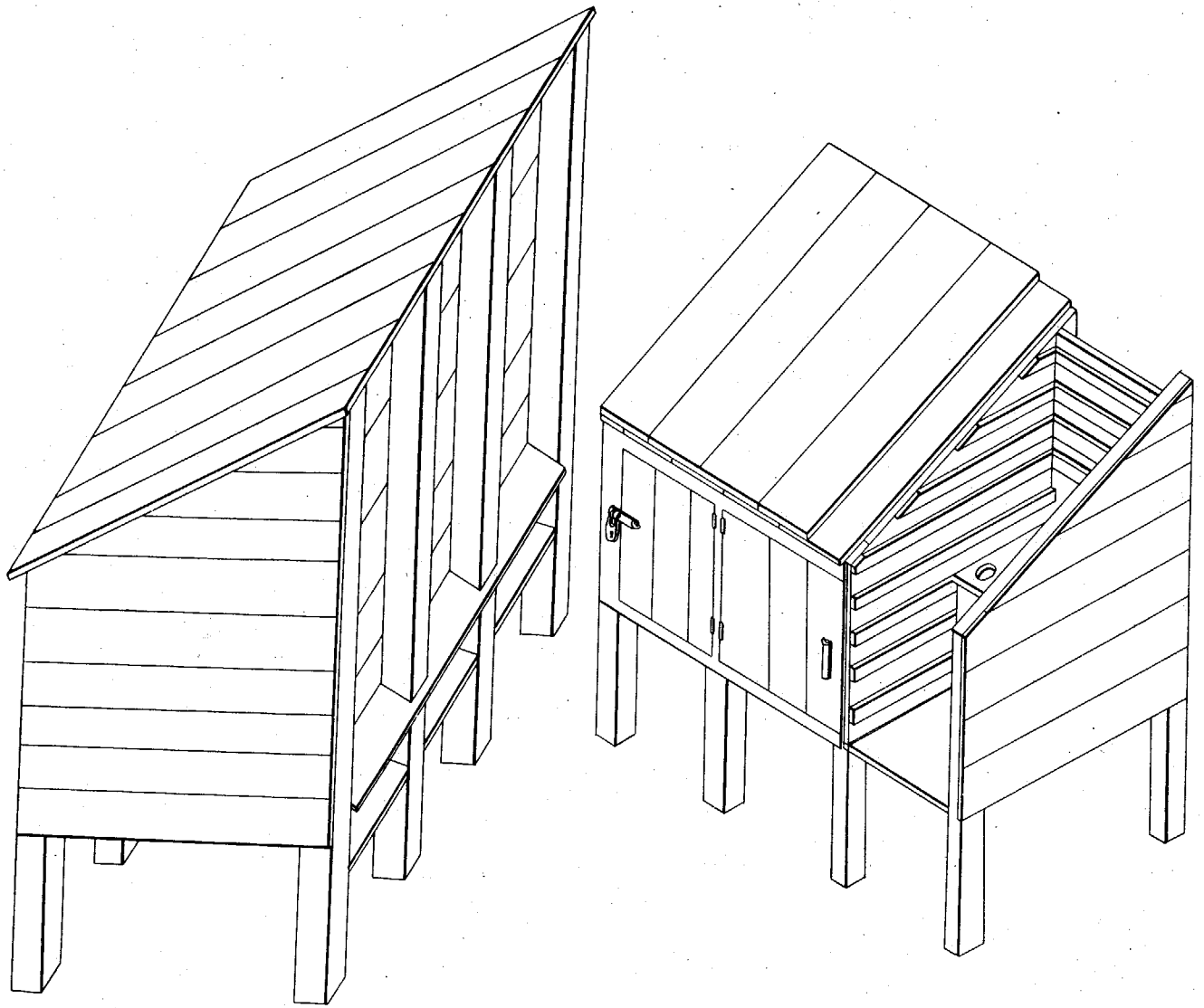
N. PETERS. Photo-Lithographer, Washington, D. C.

Philip Munch of Putnam Ohio.

Letters Patent

The Schedule referred to in these Letters Patent and making part of the
same containing a description in the words of the said Philip Munch him
self of his improvement in the Bee house and management of Bees.

To all to whom these presents shall come. Be it known that I
Philip Munch of Putnam in the County of Muskingham and State
of Ohio. have invented a new and useful improvement in the construc-
tion of Bee houses. and for the cultivation of Bees. and that the following
is a full and exact description of the invention made by me.
This invention consists of a Bee house containing three apartments construc-
ted in the following manner. let a frame of the following dimensions be con-
structed (with the front side facing the East that the Bees may have the
Sun in the early part of the day) viz ten and one half feet long and four
feet broad. the posts or studs of which eight will be necessary viz four in
front and four behind should be three by six inches thick. those in front
seven and one half feet long. those behind five and one half feet long. they
should be placed edgewise or with the narrow side out. The rafters joists
plates and other connecting timbers should be three inches square. the
bottom ends of the studs may be framed into sills or they may be left naked
like the legs of a table and set upon a foundation of stone. the joists or
or timbers which support the floor are to be framed in to the posts two and
one half feet from the lower end or in such a manner as to raise the floor
two and one half feet from the ground. the floor is to be laid double with
well seasoned inch boards. commencing with a half width board to break
joints. the sides and ends are to be boarded double in the same manner.
the front should be boarded on the inside of the studs leaving the width of
the studs on the outside for alighting boards. the alighting boards should
be bevelled outwards to turn the water. Doors are to be left on the back side
in each room two feet wide and two and two and a half feet long or large
enough to admit a hive with ease. the doors should be hung with hinges
a pane of glass may be put into the doors and covered with a shutter Drawing The rooms are to be partitioned and ceiled above doubling all the stuff or battening over the joints. ~~and [illegible]~~ the whole with a good roof. let it be particularly remembered that the rooms should be made as tight as possible not only to exclude the light and insects but also to keep the bees warm in cold weather. The rooms are to be cleated crosswise all round from bottom to top with strong cleats placed six inches apart excepting a space on the front side of the room. which is to be left uncleated in order to give room to place the hive in a proper position a sufficient number of holes are to be made through the front through which the Bees are to work. on a level with the floor on the outside of the front and about two feet above the holes a sheltering board is to be placed with the outer edge a little drooping. and broad enough to turn the water off the alighting boards. The alighting boards should be painted different colours to enable the Bees to distinguish their own houses more readily. cleats one and one half inch thick grooved or rabbetted on one edge are to be nailed around every Stud or post one foot from the ground forming a kind of trough which is to be filled with tar which should be occasionally renewed during warm weather to keep ants and other insects from having access to the hives. The whole house being thus far completed with timber rough from the saw (for it should not be planed on the inside at any rate that the bees may fasten their combs more easily) the Bees are to be put into the house in the following manner. Early in the morning when the bees are all still carry the hive gently and introduce it into the house at the door. The hive should not be set quite close to the front side of the room but within about one inch. small blocks three fourths of an inch thick are to be placed under the corners of the hive that the Bees may have room to pass freely and all around the Hive. the hive should have a sliding top or otherwise apertures in the top covered with a shutter which should now be drawn off. or if it is a common patent or double hive lift the top gently off and lay it down on the side in one corner of the room. ~~and close the outer door of the room.~~ and close the outside door of the room. when the bees will soon leave it and go to the other part of the hive. when they have all left the top it should be entirely removed leaving only the bottom part remaining. cross sticks are now to be placed on on the
cleats six inches apart reaching clear across the room, and upon these other sticks
are to be laid at right angles nine or ten inches asunder. a few small sticks
should be placed about the top of the hive in addition to give the bees a fair
opportunity of commencing their operations. The door should now be closed and
the whole left undisturbed. only examining them occasionally_ if they are
young swarms they will commence working inside of the hive first but if they
are old swarms having the hives already filled. they will immediately com
mence building their combs outside of the hive. Bee houses may be construct_
ed on this principle to any extent. any number may be joined together. they
may be made of any materials even of brick or stone, and of any dimensions de-
sirable. in short they may be successfully placed in any room out house or
other suitable place. so that it is tight and sticks placed in a proper position
to support the combs. if it should be feared that a house of the above construction
would not be warm enough in a cold climate a frame of proper construction
may be made and weather boarded on the outside. lined on the inside and filled
in with clay and cut straw or other suitable materials which will effectual-
ly guard against cold. instead of putting the Bees into the house as before
directed. they may be put in without a hive. by disengaging the string or
other substance upon which they may have settled after swarming and thus
placing them in the situation which they are intended to occupy. the object
not being the particular size or construction of the House or the manner of put-
ting the Bees into it as the principle of preventing the bees from swarming
and also of taking the honey without killing the bees. This method of
managing bees possesses important advantages over any other hitherto discov-
ered. in the common method for the want of room owing to the smallness of the hive
the bees are obliged annually to send forth new swarms which occasions con-
siderable trouble to hive them. and often the entire loss of the swarms they sent
out. swarms which come out late in the season owing to the scarcity of
flowers in the latter part of the summer. are frequently unable to collect a
sufficient quantity of honey to support them during the ensuing winter and
they consequently perish. in this method there will be no necessity of chan-
ging or taking the tops off of the hives or the cruel practice of killing the 6672x July 27, 1831 bees to come at the honey. but it may be cut out at any time when wanted for use especially in winter without in the least disturbing the operations of the bees. In this method all the above mentioned inconveniences will be avoided. the bees having ample room to work and not being obliged to send out new swarms will increase and collect their honey with astonishing rapidity Exd. Witnesses
W.J.L. Wm H. Moore
John Herron Philip Munch (1442 words)